United States Patent [19]

Theising

[11] Patent Number: 5,272,948
[45] Date of Patent: Dec. 28, 1993

[54] SCROLL SAW BLADE HOLDER

[75] Inventor: John L. Theising, St. Louis County, Mo.

[73] Assignee: Emerson Electric Co., St. Louis, Mo.

[21] Appl. No.: 11,949

[22] Filed: Feb. 1, 1993

[51] Int. Cl.⁵ .............................................. B27B 19/02
[52] U.S. Cl. ...................................... 83/786; 83/699; 83/781; 30/392
[58] Field of Search ................. 83/640, 698, 699, 781, 83/782, 783, 784, 786; 30/392

[56] References Cited

U.S. PATENT DOCUMENTS

| | | | |
|---|---|---|---|
| 2,721,587 | 10/1955 | Dremel | 144/242 B |
| 2,731,988 | 1/1956 | Steiner | 83/784 |
| 2,735,685 | 2/1956 | Karr | 30/392 X |
| 4,503,742 | 3/1985 | Sutton | 83/781 |
| 4,625,609 | 12/1986 | Ashworth | 83/748 |
| 4,670,986 | 6/1987 | Chen | 30/392 |
| 4,681,006 | 7/1987 | Miller | 83/782 |
| 4,807,507 | 2/1989 | Rice et al. | 83/783 |
| 4,838,138 | 6/1989 | Rice et al. | 83/698 |
| 4,841,823 | 6/1989 | Brundage | 83/781 |
| 4,953,431 | 9/1990 | Chen | 83/783 X |
| 5,016,512 | 5/1991 | Huang | 83/786 X |

Primary Examiner—Eugenia Jones
Assistant Examiner—Raymond D. Woods
Attorney, Agent, or Firm—Polster, Lieder, Woodruff & Lucchesi

[57] ABSTRACT

A scroll saw blade holder having a blade support mounted on at least one scroll saw arm. A blade holder frame is pivotally attached to the support and is formed in a generally V-shape for receiving a complementary V-shaped wedge. A first space between a first side of the wedge and the holder allows for the insertion of a scroll saw blade in line with the scroll saw arm and a second space between the wedge and a second side of the holder allows for the insertion of a blade at a 90° angle to the scroll saw arm. A thumb screw inserted through a hole in the wedge and engaging a threaded hole in the holder urges the wedge into the holder, thereby pinching the blade in either of the aforementioned useful positions.

9 Claims, 3 Drawing Sheets

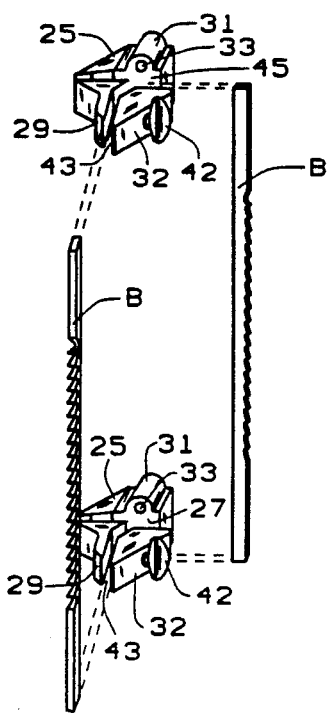
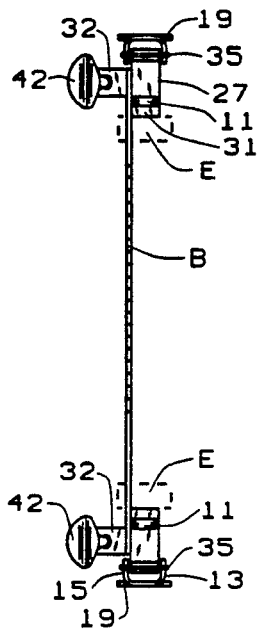
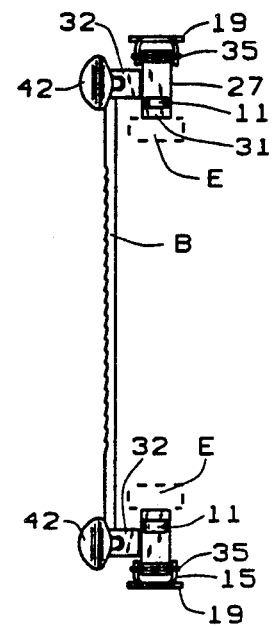
FIG. 6   FIG. 7   FIG. 8
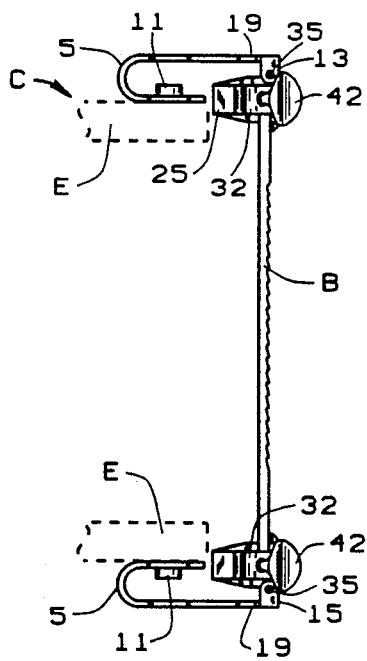
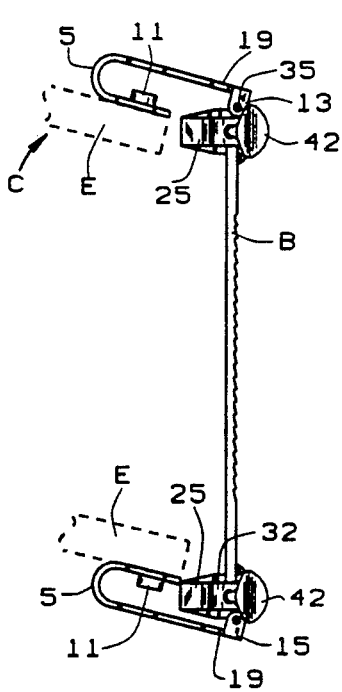
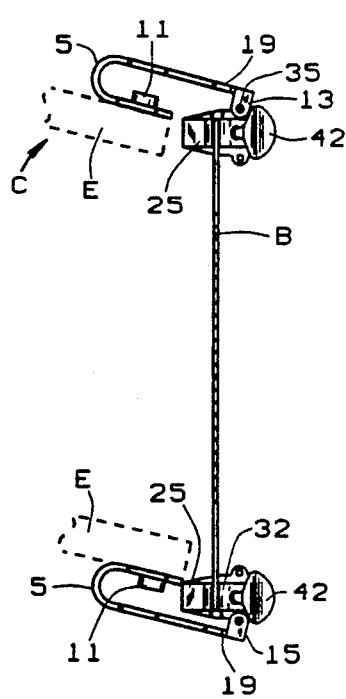
FIG. 9   FIG. 10   FIG. 11

SCROLL SAW BLADE HOLDER

BACKGROUND OF THE INVENTION

This invention relates generally to scroll saws which have a saw blade connected between the free ends of the arms of a generally C-shaped or U-shaped member or yoke which reciprocates about a point at the closed end of the yoke to drive the saw blade. More particularly, this invention relates to an apparatus for securing each end of the saw blade to the free ends of the arms of the yoke.

Generally, at least one end of the blade is attached to the free end of an arm by a blade holder and the other end of the blade is secured to the opposite free end of the other arm. Various devices have been used to attach the blade to the free end of the arm. For example, in U.S. Pat. No. 4,503,742 to Sutton, there is disclosed a blade holder which appears to be a simple clamping mechanism for holding the blade in one useful position relative to the moving member. However, the Sutton patent does not appear to provide for a pivotably mounted blade holder of the type that would allow the cutting edge of the blade to remain in proper alignment with a workpiece as the yoke reciprocates. Moreover, the Sutton blade holder only allows for one position of the blade relative to the reciprocating arm.

U.S. Pat. No. 4,841,823 to Brundage discloses a scroll saw holder which allows for two different positions of the blade. The holder can accommodate a front facing blade and a side facing blade. However, the Brundage patent does not appear to disclose a means for allowing the blade holder and blade to pivot during reciprocation of the scroll saw arms especially when the blade is attached in the second position, that is when the blade is at a 90° angle to the reciprocating arm, so as to maintain the optimum position of the cutting edge of the blade relative to a workpiece during operation of the saw with the blade in a 90° position.

U.S. Pat. No. 4,838,138, to Rice et al. describes a scroll saw blade holder and blade aligning device that allows for some pivoting movement of the blade relative to the arms; however, this invention only accommodates one blade position. U.S. Pat. No. 4,807,507, also to Rice et al., discloses a self-lubricating holder for holding a scroll saw blade.

U.S. Pat. No. 4,670,986, to Chen describes a saw blade suspension device for supporting a blade between the arm of a scroll saw. However, the Chen patent allows for the mounting of the blade in one position relative to the reciprocating arms. Furthermore, it is not clear from the Chen patent whether or not the blade holder and blade can pivot relative to the reciprocating arm during use. The Chen patent requires the use of a plurality of parts including a relatively soft main body, a hard pin made of different material, a hardened flat washer, as well as other parts. The Chen device appears to be very complex to assemble and use and even more costly to manufacture.

In FIGS. 7 and 8 of U.S. Pat. No. 2,721,587 to Dremel, there is disclosed a blade holding apparatus for a bench jigsaw having a releasable holding device that allows for the release of blade when it is desired to reciprocate the saw blade transversely of the longitudinal axis of the saw table.

As can be seen from description of the aforementioned prior art scroll saw blade holders, none of the prior art holders adequately address the problems associated with a blade holder in actual use. For example, it is quite useful and convenient to have a saw that allows for the mounting of the blade both in line with a C-shaped arm and also in a 90° angle to the C-shaped arm. Moreover, with a C-shaped arm saw, it is essential to allow the blade to pivot slightly relative to the saw arms in order for the blade to be moved rapidly in a rectilinear path without breaking the blade during the sawing operation. Therefore, it is desirable to have a blade holder apparatus that allows for the proper pivoting of the saw blade when a saw blade is mounted in line with the reciprocating arm or when the saw blade is mounted at 90° to the reciprocating arm. It is also desirable to have a blade holding assembly that allows for the quick release of the blade so that the blade can be conveniently moved from a position in line with the arm to a position 90° to the arm without the use of screwdrivers, pliers, wrenches or other tools. Furthermore, the blade holder assembly should be constructed of a simple design consisting of a minimal number of parts that are easy and economical to manufacture and simple to use.

SUMMARY OF THE INVENTION

It is therefore an object of the present invention to provide a scroll saw blade holder assembly that will accommodate a blade in a cutting position parallel to the reciprocating arms or in a position at a 90° angle to the reciprocating arms.

Another object of the invention is to provide a scroll saw holder assembly in which the blade can be easily and conveniently replaced or moved from one cutting position to another cutting position by loosening and tightening one thumb screw.

Still another object of the invention is to provide a scroll saw holder assembly that allows some pivoting of the saw blade in response to the reciprocation of the arms, thereby maintaining the blade in a proper cutting alignment relative to the workpiece to prevent premature wear and breakage.

Yet another object of the invention is to provide a scroll saw holder assembly that allows the blade to pivot in proper alignment with the workpiece when the blade is positioned in alignment with the reciprocating arm and when the blade is positioned in a 90° angle to the reciprocating arm.

A further object of the invention is to provide a scroll saw holder assembly that is constructed from a minimum number of parts, is simple and economical to manufacture and assemble, easy to use, and is well suited for its intended purpose.

Briefly stated, a scroll saw blade holder assembly is provided having a blade support mounted to at least one arm of a reciprocating yoke and a complementary male/female holder assembly pivotally attached to the support. The holder assembly is comprised of a generally V-shaped holder and a complementary shaped retention wedge within the holder. The relationship of the wedge to the complementary shaped holder creates two slots between the wedge and the holder for the insertion of one end of the blade. When positioned in one slot, the blade is positioned with its cutting edge in line with reciprocating saw arms. When positioned in the second slot, the cutting edge of the blade is at a 90° angle to the reciprocating arms to provide an alternative cutting position. The wedge is urged against the blade and against the holder, thereby securing the blade in place by the use of a single thumb screw which engages threaded holes in both the wedge piece and the holder. The blade may be replaced or changed from one position to the other simply by loosening the thumb screw. Furthermore, the pivoting design allows the blade to remain at a proper cutting angle relative to the workpiece during reciprocation of the arms when the blade is mounted in either the in-line position or mounted in the 90° position.

BRIEF DESCRIPTION OF THE DRAWINGS

FIG. 6 is a perspective view of two saw blade holder assemblies of the present invention without the blade supports attached and illustrating the two alternative positions for mounting a scroll saw blade;

FIG. 7 is a perspective view of a saw blade holder assembly of the present invention attached to two opposed free ends of a scroll saw yoke, the scroll saw blade being mounted in-line with the free ends;

FIG. 8 is a perspective view of a saw blade holder assembly of the present invention attached to two opposed free ends of a scroll saw yoke, the blade mounted at a 90° angle to the free ends;

FIG. 9 is a side elevational view of the saw blade assembly of the present invention attached to each free end of a scroll saw yoke;

FIG. 10 is a side elevational view of a scroll saw blade holder assembly of the present invention attached to each free end of a scroll saw yoke, demonstrating the pivotable feature of the assembly; and FIG. 11 is a side elevational view of a saw blade holder assembly of the present invention attached to each free end of the scroll saw yoke demonstrating the pivotal feature of the assembly, the blade being mounted at 90° to the free end of the yoke.

DESCRIPTION OF THE PREFERRED EMBODIMENT

Figure 1:
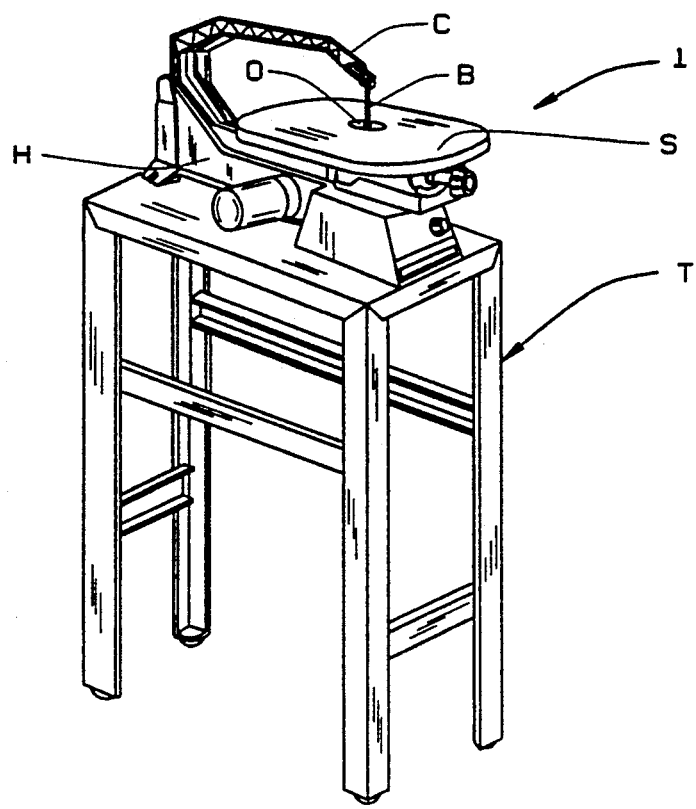
FIG. 1 is a perspective view of a scroll saw of the type in which a blade holder assembly of the present invention may be used.

A scroll saw of the type generally to which the present invention relates is shown at 1 in FIG. 1. The saw has a four-legged platform table T with the motor drive and internal electrical working mechanism of the saw housed within housing H. The saw has a working surface S on which a workpiece (not shown) can be placed. A thin blade B is attached to C-arm or yoke and extends down through an opening O in surface S and can be attached to a second arm (not shown) of the yoke or other suitable structure. In operation, C-arm C reciprocates thereby moving blade B in a rectilinear manner. A workpiece (not shown) is placed on surface S to engage the cutting edge of saw blade B to perform the sawing function.

Figure 2:
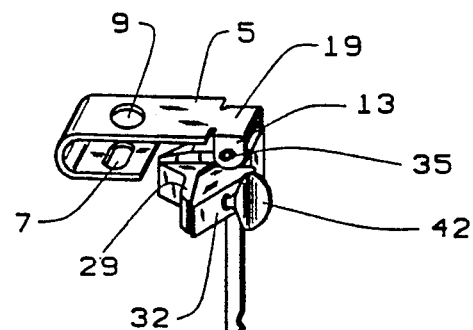
FIG. 2 is a perspective view of a blade holder assembly of the present invention secured to each end of a scroll saw blade.
Figure 2:
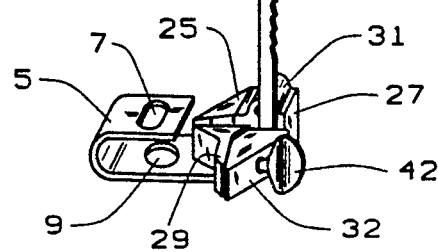
Figure 3:
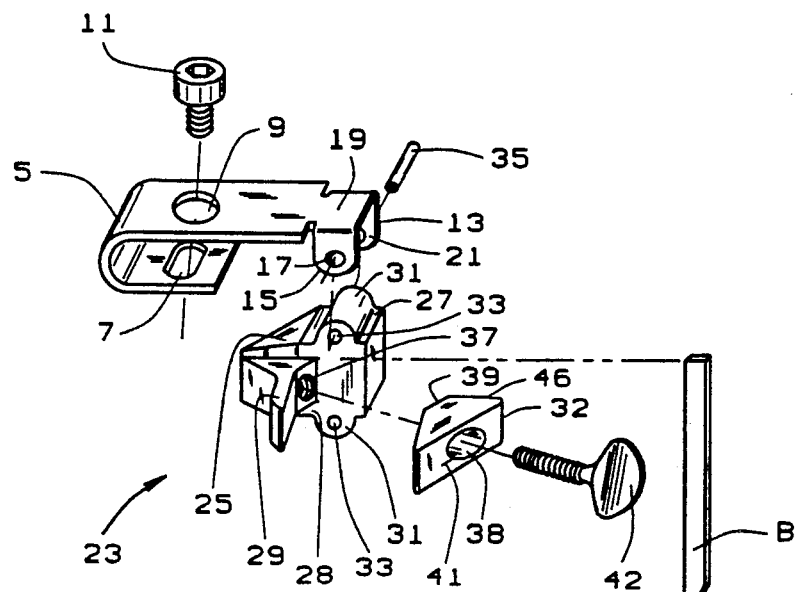
FIG. 3 is an enlarged, exploded view of the assembly as shown in FIG. 2.

FIGS. 2 and 3 best illustrate the component parts of the scroll saw holder assembly of the present invention. This particular embodiment of the assembly is designed to pivotally attach a saw blade to two opposed arms of a scroll saw. It should be noted that the assembly can be used to pivotally attach only one end of a blade while using any other acceptable means of attachment to secure the second end of the blade to the other opposed arm or other structural components of a scroll saw. For purposes of illustration, the assembly will be shown attaching both ends of a saw blade to a free end of a C-shaped scroll saw arm. It should be obvious, however, that the assembly can be used to attach either one or both ends of a saw blade to appropriate structures of a scroll saw without departing from the scope or spirit of the invention.

The assembly is comprised of a blade support 5 having mounting means such as a hole or slot 7 formed therein to permit attachment of blade support 5 to the free end E of a scroll saw arm. For example, as shown in FIGS. 3 and 9-11, a bolt or screw 11 or other suitable means can be inserted into hole 7 and into a pre-drilled threaded hole (not shown) in free end E of a C arm. It should be noted that another hole 9 is formed in the upper surface of support 5 to permit access to screw 11 with a tool such as a screwdriver or a hex wrench to permit the tightening or removal of screw 11. Blade support 5 is formed in a generally elongated C-shape and made from machined steel or other appropriate material so as to provide limited flexibility and resiliency of support 5 during operation of the saw.

Blade support 5 has pivot ears 13 and 15 with pivot holes as at 17 (FIG. 3) formed therein depending from an upper flat surface 19. Space 21 between ears 13 and 15 is designed to accommodate blade holder 23 as will be further explained hereinafter.

Figures 4, 5:
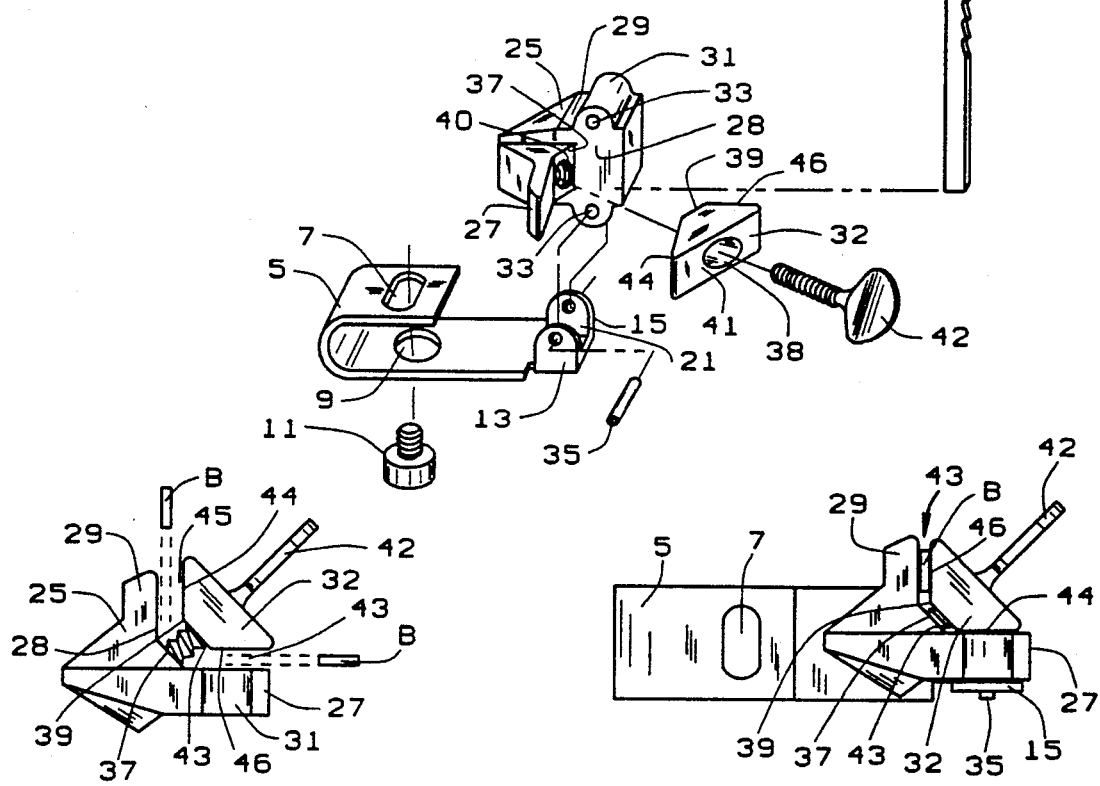
FIG. 4 is a top plan of a saw blade holder assembly of the present invention, without the blade support component attached.
FIG. 5 is a bottom plan of the saw blade holder assembly of the present invention.

Blade holder 23 is formed from powder metal, steel or other appropriate material and is shown in greater detail in FIGS. 4-6. Blade holder 23 is pivotally attached to blade support 5 as follows: Blade holder 23 has a body portion 25 with a splayed first wall 27 and a splayed second wall 29 also extending therefrom at an angle of approximately 90° to the first wall 27. First wall 27 and second wall 29 define an opening or notch 28. First wall 27 has a pair of pivot hole bosses 31 formed thereon, each boss having a pivot hole 33 formed therethrough. The machining of holder 23 with two pivot hole bosses, one on each side of wall 27, provides for versatility and allows holder 23 to be used with a support on both a top scroll saw arm free end or a lower free end. Boss 33 is constructed to fit between ears 13 and 15 of support 5 with holes 33 aligning with holes 17. A pivot pin 35 is inserted through hole 17 and 33 to secure holder 23 in a pivotal arrangement within support 5. A flat, central portion 37 of body 25, located between walls 27 and 29, has a threaded hole 40 formed therein to receive a thumb screw and also serves to receive, the flat, complementary abutting face 39 of holder wedge 32 as will now be explained in greater detail.

Wedge 32, with oval shaped hole 38 formed therethrough, is a generally triangular piece made of powder metal or other appropriate material. Wedge 32 has a pair of opposed flat faces 39 and 41 and a pair of splayed side wall faces 44 and 46 arranged at a 90° angle to each other. It should be noted that wedge 32 is complementary in shape to notch 28 formed in holder 23. Wedge 32 fits in notch 28 and is held in place within notch 28 and can be urged tightly toward walls 27 and 29 and face 37 by thumb screw 42 which extends through holes 38 in wedge 32 and threaded hole 40 in holder body 25. Although this particular embodiment shows the use of a thumb screw, it should be noted that any appropriate means such as a hex bolt or slot screw or wing nut assembly can be used. The primary advantage of the thumb screw 42 is that it can be manipulated by hand and requires no other tool. The foregoing complementary arrangement between wedge 32 and holder 5 provides for the unique saw mounting features of the present invention, as will now be explained in more detail.

When wedge 32 is seated loosely within notch 28, it creates two spaces 43 and 45, (see FIGS. 4-6) providing means for inserting a blade B. As shown, an extreme end of blade B can be inserted in space 43 so that the cutting edge of blade B is aligned with the scroll saw arm, or in space 45 so that the cutting edge of blade B is at a 90° angle to the reciprocating arm. When screw 42 is rotated into threaded hole 40, wedge 32 is urged deeper into notch 28. As best shown in FIG. 5, with one end of blade B is inserted into space 43, wall face 46 engages blade B and wall face 44 abuts interior face of holder wall 27. Oval hole 38 in wedge 32 allows some lateral movement of wedge 32 about screw 42 to assure that faces 44 and 46 seat properly against the blade and wall. The user can tighten screw 42 creating torque at the face 44/wall 27 abuttment and forcing face 46 to push against blade B, thereby pinning blade B between face 46 and the interior face of holder wall 29. As further illustrated in FIG. 4, it should be noted that blade B can be inserted and secured in space 45 under the same principles.

FIGS. 6-8 further illustrate the unique, two-way blade attachment characteristics of the present invention. Each end of blade B can be attached to a free end E of a scroll saw arm so that the blade is aligned with the arm (FIG. 7) or attached in a position 90° to the arm (FIG. 8). Moreover, employing the assembly as just described, blade B can be easily moved from the first position to the second position simply by loosening and backing out screw 42, removing blade B from one slot, inserting it the other slot, and then tightening screw 42 (FIG. 6). This unique construction allows the user to replace a blade or change a blade position quickly and easily without the use of tools or without the dismantling of the C arm or removal of the workpiece on surface S (FIG. 1).

FIGS. 9-11 illustrate in more detail the pivotable features of the blade holer assembly. As noted above, it is desirable to have a blade holder assembly that allows for some flexibility and pivoting of the blade as the arm or yoke reciprocates creating the cutting motion of the blade. This flexibility and pivoting prevents premature wear and breaking of the blade during use and serves to maintain proper alignment of the cutting edge of the blade with the workpiece as the blade moves in a rectilinear blade path. It is important to maintain proper blade position when the blade is mounted at a 90° angle to the reciprocating arm, as well as when it is mounted in line with the arm.

As previously described, the configuration of and spring steel construction of support 5 adds some flexibility and resiliency to the assembly. However, FIGS. 9-11 illustrate the relative position of blade B in two stages of reciprocation of the scroll saw arm or yoke. As shown, as the arm moves, support 5 pivots about pivot pin 35 allowing the blade to remain on a generally rectilinear path. This unique construction maintains the optimum cutting position of blade B, when blade B is mounted in-line with the scroll saw arm (FIG. 10). It also allows blade B to remain in the proper position and move along a generally rectilinear path when blade B is attached at a 90° angle to the reciprocating saw arm (FIG. 11). In both positions, the cutting edge of blade B remains perpendicular to the workpiece for proper cutting.

It will be apparent to those skilled in the art that various changes and modifications can be made in the invention as illustrated without departing from the spirit and scope of the invention. Therefore, the foregoing description as well as the accompanying illustrations are intended for illustrative purposes only and should not be construed in a limiting sense.

What is claimed:

1. A saw blade holding apparatus for a scroll saw comprising:
   at least one scroll saw arm having a blade support removably mounted thereon;
   a blade holder pivotally mounted to said blade support said blade holder having a body portion, a first wall extending from said body portion and a second wall extending from said body portion at an angle 90° to said first wall, said body portion and said first and said second wall defining an opening;
   a wedge means complementary in shape to said blade holder opening for wedging a blade securely between said wedge means and said blade holder, said wedge means and said blade holder defining a first space for wedging said blade between said wedge means and said holder in a position in line with said scroll saw arm and a second space for wedging said blade between said wedge means for retaining and said blade holder in a position of 90° to said scroll saw arm; and
   means for retaining said wedge means and said blade in assembled relationship to each other, said means includes a thumb screw extending through said wedge means and threadably connected to said blade holder at a position on said body portion intermediate said first and second walls to draw said wedge means tightly onto said holder for pinching and tightly securing said blade.

2. The invention of claim 1 wherein said wedge means is generally triangular in shape.

3. A saw blade holding apparatus for a scroll saw comprising:
   at least one scroll saw arm having a blade support mounted thereon;
   a blade holder pivotally mounted to said blade support;
   a generally triangular shaped wedge means for wedging a blade securely between said wedge means and a complementary shaped opening in said blade holder, said wedge means and said complementary shaped opening in said blade holder defining a first space for wedging said blade between said wedge means and said blade holder in a position in line with said scroll saw arm and a second space for wedging said blade between said wedge means and said blade holder in a position at approximately 90° to said scroll saw arm, and
   means for retaining said wedge means and said blade in assembled relationship to each other including an oval shaped hole formed in said wedge means and a threaded hole formed in said blade holder and a threaded screw engaging both said oval and said threaded holes whereby said threaded screw is rotated to draw said wedge means tightly onto said holder for pinching and tightly securing the blade.

4. In a scroll saw having opposed reciprocating scroll saw arms and a blade support removably secured to at least one of said arms, the improvement comprising:
- a blade holder pivotally attached to the blade support and having a body portion with two opposed walls formed at a 90° angle to each other extending from said body portion and an opening formed between said walls;
- a complementary shaped blade retention member within said blade holder opening; a first and a second space between said blade holder walls and said blade retention member; and
- screw means for adjustably urging said blade retention member against said blade holder walls and against a blade placed within either said first or said second space thereby holding the blade in a useful position, said screw means extending through said blade retention member and threadably engaging said body portion of said blade holder.

5. The invention of claim 4 wherein said first space allows positioning of said saw blade in alignment with the saw blade arms.

6. The invention of claim 4 wherein said second space allows positioning of the saw blade at a 90° angle to said saw blade arms.

7. A blade holding device for a scroll saw having at least one reciprocating arm comprising:
- a blade support removably attached to the arm;
- a blade holder pivotally attached to said blade support and having a first wall and a second wall extending from said support at an angle approximately 90° to each other, said first and second walls defining an opening;
- a complementary shaped blade retention member within said blade holder opening between said walls;
- said first wall and said retention member defining a first space for insertion of a saw blade;
- said second wall and said retention member defining a second space for insertion of said saw blade; and
- means for adjustably urging said retention member against said walls and said saw blade thereby holding the saw blade in either the first or said second space, said means for adjustably urging comprising a screw extending through said retention member and threadably engaging said blade support.

8. The invention of claim 7 wherein said first space between said first wall and said retention member enables said blade to be secured to alignment with said scroll saw arm.

9. The invention of claim 7 wherein the second space between said second wall and said retention member enables said blade to be secured at a 90° angle to said scroll saw arm.

* * * * *

UNITED STATES PATENT AND TRADEMARK OFFICE
CERTIFICATE OF CORRECTION

PATENT NO. : 5,272,948
DATED : December 28, 1993
INVENTOR(S) : John L. Theising

It is certified that error appears in the above-indentified patent and that said Letters Patent is hereby corrected as shown below:

Column 6, line 31 is "means for retaining and", should be -- means and said --; and Column 6, lines 35 and 36 is "means includes", should be -- means for retaining includes --.

Signed and Sealed this

Thirtieth Day of August, 1994

*Attest:*

*Attesting Officer*

BRUCE LEHMAN

*Commissioner of Patents and Trademarks*